United States Patent
Kimura

(10) Patent No.: US 10,415,512 B2
(45) Date of Patent: Sep. 17, 2019

(54) INTERNAL COMBUSTION ENGINE

(71) Applicant: Toyota Jidosha Kabushiki Kaisha, Toyota-shi, Aichi-ken (JP)

(72) Inventor: Koshiro Kimura, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/958,458

(22) Filed: Apr. 20, 2018

(65) Prior Publication Data

US 2018/0313299 A1 Nov. 1, 2018

(30) Foreign Application Priority Data

Apr. 28, 2017 (JP) ................................ 2017-089951

(51) Int. Cl.
| | | |
|---|---|---|
| *F02M 25/10* | (2006.01) | |
| *F02M 43/04* | (2006.01) | |
| *F02D 41/30* | (2006.01) | |
| *F02M 69/04* | (2006.01) | |
| *F02D 41/40* | (2006.01) | |
| *F02D 19/06* | (2006.01) | |
| *F02D 41/00* | (2006.01) | |
| *F02D 41/38* | (2006.01) | |

(52) U.S. Cl.
CPC ......... *F02M 25/10* (2013.01); *F02D 19/0644* (2013.01); *F02D 19/0692* (2013.01); *F02D 41/0025* (2013.01); *F02D 41/3094* (2013.01); *F02D 41/401* (2013.01); *F02M 43/04* (2013.01); *F02M 69/044* (2013.01); *F02D 41/0027* (2013.01); *F02D 2041/389* (2013.01); *Y02T 10/121* (2013.01)

(58) Field of Classification Search
CPC ...... F02M 25/10; F02M 43/04; F02M 69/044; F02D 19/0644; F02D 19/0692; F02D 41/0025; F02D 41/3094; F02D 41/401; F02D 41/0027; F02D 2041/389
USPC ................................ 123/445, 431, 432, 308
See application file for complete search history.

(56) References Cited

U.S. PATENT DOCUMENTS

| | | | | |
|---|---|---|---|---|
| 2006/0283423 | A1* | 12/2006 | Ito ................. | F02D 19/081 |
| | | | | 123/406.45 |
| 2007/0193534 | A1* | 8/2007 | Ito ................. | F02D 19/081 |
| | | | | 123/1 A |

FOREIGN PATENT DOCUMENTS

| | | | |
|---|---|---|---|
| JP | 2006052686 A | * | 2/2006 |
| WO | 2013/021434 A1 | | 2/2013 |

* cited by examiner

*Primary Examiner* — Mahmoud Gimie
(74) *Attorney, Agent, or Firm* — Dinsmore & Shohl LLP

(57) ABSTRACT

An object is to prevent hydrogen from burning before the time of ignition. An internal combustion engine is provided with a first intake port and a second intake port connected to a cylinder, a first fuel injection valve that injects fuel into the first intake port, and an ignition plug provided at a location at which the gas flowing into the cylinder from the second intake port impinges on the ignition plug in a larger quantity than the gas flowing into the cylinder from the second intake port during the intake stroke.

5 Claims, 10 Drawing Sheets

INTERNAL COMBUSTION ENGINE

CROSS REFERENCE TO RELATED APPLICATIONS

This application claims priority to Japanese Patent Application. No. 2017-089951 filed on Apr. 28, 2017 the entire contents of which are incorporated by reference herein.

TECHNICAL FIELD

The present disclosure relates to an internal combustion engine.

BACKGROUND ART

It is known to provide an internal combustion engine having two intake ports for each cylinder with a first fuel injection valve that injects hydrocarbon in one of the ports and a second fuel injection valve that injects hydrogen in the other port (see, for example, Patent Literature 1 specified below).

CITATION LIST

Patent Literature

Patent Literature 1: WO/2013/021434

SUMMARY

Technical Problem

Hydrogen can burn over a wide range of excess air factor (e.g. between 0.14 to 10). Moreover, hydrogen has high ignitability. Therefore, if hydrogen flowing into a cylinder comes in contact with a hot part of the cylinder, hot surface ignition can occur at the hot part before the time of ignition. This can lead to pre-ignition and/or backfire.

The present disclosure has been made to solve the above problem, and an object of the present disclosure is to prevent hydrogen from burning before the time of ignition.

Solution to Problem

To solve the above problem, according to the present disclosure, an internal combustion engine using hydrocarbon and hydrogen as fuel is provided with a first intake port and a second intake port connected to a cylinder, a first fuel injection valve provided in said first intake port to inject hydrogen into said first intake port, and an ignition plug provided at a position at which the gas flowing into the cylinder from said second intake port impinges on said ignition plug in a larger quantity than the gas flowing into the cylinder from said first intake port during the intake stroke.

Mixture gases containing hydrogen have higher ignitability than mixture gases containing hydrocarbon. Combustion of a mixture gas containing hydrocarbon can be promoted using this characteristics. However, when hydrogen comes in contact with the ignition plug, hot surface ignition tends to occur, because the ignition plug has a relatively high temperature in the cylinder. If hydrogen comes in contact with the hot ignition plug before the time of ignition, there is a possibility that hydrogen may start to burn by hot surface ignition before the time of ignition. To prevent this, the ignition plug is disposed at a position at which the gas flowing into the cylinder from the second intake port impinges on the ignition plug in a larger quantity than the gas flowing into the cylinder from the first intake port. By this arrangement, hydrogen flowing into the cylinder from the first intake port can be prevented from coming in contact with the hot ignition plug, and hot surface ignition can be prevented from occurring. If a gas that does not contain hydrogen flows into the cylinder from the second intake port, the gas not containing hydrogen can impinge on the ignition plug. The temperature of the gas that flows into the cylinder from the second intake port is lower than the temperature of the ignition plug, and therefore the impingement of the low temperature gas lowers the temperature of the ignition plug.

The internal combustion engine according to the present disclosure may further include a second fuel injection valve that is provided in said second intake port to inject hydrocarbon into said second intake port, and said ignition plug may be disposed at a position at which the temperature of said ignition plug is made lower when hydrocarbon is injected by said second fuel injection valve than when hydrocarbon is not injected by said second fuel injection valve.

Hydrocarbon is less susceptible to hot surface ignition than hydrogen. Hence, even if hydrocarbon comes in contact with the ignition plug, combustion is hardly caused by hot surface ignition before the time of ignition. Therefore, even if hydrocarbon injected through the second fuel injection valve comes in contact with the ignition plug, combustion is hardly caused by hot surface ignition before the time of ignition. Moreover, in cases where liquid hydrocarbon is injected into the second intake port, the gas flowing into the cylinder from the second intake port is cooled by the latent heat of vaporization of the hydrocarbon. The impingement of the gas thus cooled on the ignition plug provides cooling of the ignition plug.

The internal combustion engine according to the present disclosure may further include a third fuel injection valve that is provided in said cylinder to inject hydrocarbon into said cylinder, said ignition plug may be disposed at a position closer to the connection of said second intake port and said cylinder than the connection of said first intake port and said cylinder, and said third fuel injection valve may have an injection port oriented in a direction from said first intake port side to said second intake port side but no injection port oriented in a direction from said second intake port side to said first intake port side.

Injecting hydrocarbon through said third fuel injection valve structured as above can create a gas flow in a direction from the first intake port side to the second intake port side. This gas flow thrusts the gas present on the second intake port side to move it in a direction toward the first intake port side. Furthermore, the gas moved from the second intake port side to the first intake port side thrusts the gas present on the first intake port side to move it an a direction toward the second intake port side. Thus, the hydrogen present on the first intake port side can be brought to the region around the ignition plug. At that time, the ignition plug is already cooled by the gas flowing into the cylinder from the second intake port, and therefore the impingement of hydrogen on the ignition plug does not lead to hot surface ignition. After highly ignitable hydrogen has been brought to the region around the ignition plug, hydrogen is ignited by the ignition plug to burn. Propagation of flame created by this combustion of hydrogen helps more reliable combustion of hydrocarbon.

The internal combustion engine according to the present disclosure may further include a controller configured to cause said third fuel infection valve to inject hydrocarbon during the compression stroke after the intake bottom dead center.

After the intake bottom dead center, suction of hydrogen from the first intake port is almost finished. Therefore, it is possible to bring a larger quantity of hydrogen to the region around the ignition plug by injecting hydrocarbon through the third fuel injection valve. Thus, improved combustion can be achieved.

The internal combustion engine according to the present disclosure may further include a second intake valve that opens and closes said second intake port and a controller configured to advance the time to finish closing said second intake valve from said intake bottom dead center.

The gas taken into the cylinder receives heat from the wall of the cylinder, piston, intake valve, exhaust valve, and residual gas, so that its temperature rises. If the gas heated in the cylinder flows back into the second intake port, temperature gas will flow into the cylinder in the next intake stroke. Then, cooling of the ignition plug by the gas flowing into the cylinder from the second intake port will be slowed down. If the time to finish closing the second intake valve is advanced from (i.e. set earlier than) the intake bottom dead center, the backflow of the heated gas to the second intake port from the cylinder is prevented from occurring during the compression stroke. In consequence, cooling of the ignition plug can be promoted by the gas flowing into the cylinder from the second intake port. Therefore, hot surface ignition is prevented from occurring when hydrogen comes in contact with the ignition plug.

Advantageous Effects

The present disclosure can prevent hydrogen from burning before the time of ignition.

DETAILED DESCRIPTION

In the following, modes for carrying out the present disclosure will be specifically described as embodiments for illustrative purposes with reference to the drawings. It should be understood that the dimensions, materials, shapes, relative arrangements, and other features of the components that will be described in connection with the embodiments are not intended to limit the scope of the present disclosure only to them, unless stated otherwise.

First Embodiment

Figure 1:
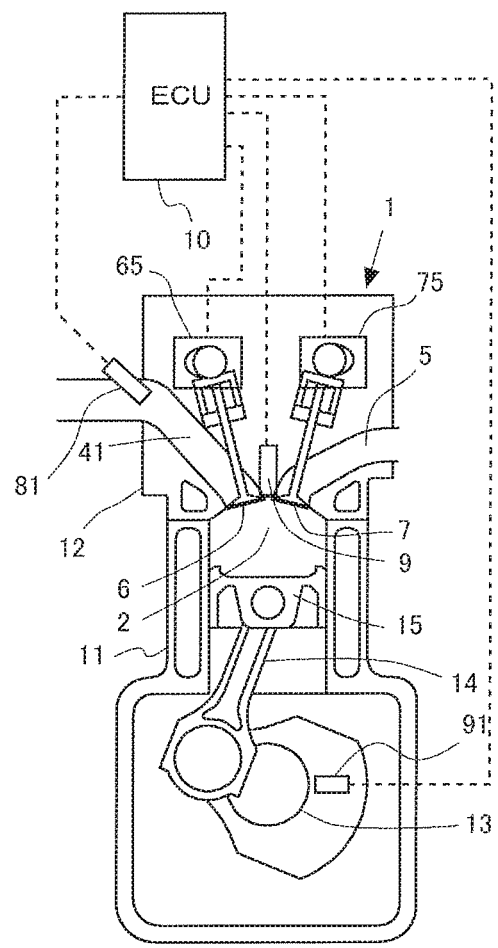
FIG. 1 is a diagram showing the general configuration of an internal combustion engine 1 according to first to third embodiments.
Figure 2:
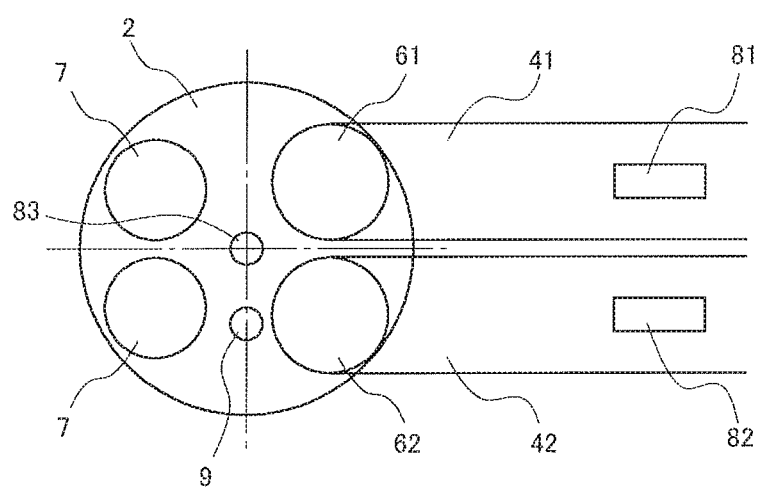
FIG. 2 is a schematic diagram showing a cylinder of the internal combustion engine according to the first embodiment seen from above.

FIG. 1 is a diagram showing the general configuration of an internal combustion engine according to an embodiment of the present disclosure. FIG. 2 is schematic diagram showing a cylinder 2 of the internal combustion engine 1 according to the embodiment seen from above. To simplify the illustration of the internal combustion engine 1 according to the embodiment, some components of the internal combustion engine are not shown in the drawings. The internal combustion engine mounted on, for example, a vehicle.

The cylinder block 11 of the internal combustion engine 1 is provided with the cylinder 2. The cylinder head 12 of the internal combustion engine 1 is provided with intake ports 4 and exhaust ports 5. To each cylinder 2 are connected two intake ports 4 and two exhaust ports 5. In FIG. 2, one of the intake ports 4 is indicated as the first intake port 41, and the other is indicated as the second intake port 42. In the following, the first/second intake port 41, 42 will also be simply referred to as the intake port 4, when it is not necessary to discriminate them. The intake port 4 is shaped in such a way that the intensity of tumble and swirl is smaller than a specific intensity. In other words, the intake port 4 is not shaped in such a way as to positively create tumble and swirl.

The intake port 4 is provided with an intake valve 6 at its end adjacent to the cylinder 2. The exhaust port 5 is provided with an exhaust valve 7 at its end adjacent to the cylinder 2. Thus, two intake valves 6 and two exhaust valves 7 are provided for each cylinder 2. In FIG. 2, the intake valve 6 provided at the end of the first intake port 41 adjacent to the cylinder 2 is indicated as the first intake valve 61, and the intake valve 6 provided at the end of the second intake port 42 adjacent to the cylinder 2 is indicated as the second intake valve 62. In the following, the first/second intake valve 61, 62 will also be simply referred to as the intake valve 6, when it is not necessary to discriminate them. The internal combustion engine 1 is provided with a variable intake-valve actuating mechanism 65 capable of varying the timing of opening and closing the intake valve 6 and a variable exhaust-valve actuating mechanism 75 capable of varying the timing of opening and closing the exhaust valve 7. In this first embodiment and the second embodiment that will be described later, the provision of the variable intake-valve actuating mechanism 65 and the variable exhaust-valve actuating mechanism 75 is not essential.

The internal combustion engine 1 is also provided with a first fuel injection valve 81 that injects fuel into the first intake port 41, a second fuel injection valve 82 that injects fuel into the second intake port 42, and a third fuel injection valve 83 that injects fuel into the cylinder 2. The first fuel injection valve 81 injects hydrogen as fuel, and the second fuel injection valve 82 and the third fuel injection valve 83 inject hydrocarbon as fuel, which is, for example, gasoline and will be referred to as gasoline hereinafter. The internal combustion engine 1 is also provided with an ignition plug 9 that generates an electric spark in the cylinder 2.

In the cylinder 2 is provided a piston 15, which is connected to the crankshaft 13 of the internal combustion engine 1 by a connecting rod 14 and reciprocates in the cylinder 2.

An ECU 10 is provided for the internal combustion engine 1. The ECU 10 is an electronic control unit that controls the internal combustion engine 1. The ECU 10 includes a CPU, a ROM in which various programs and maps are stored, and a RAM. The ECU 10 controls the internal combustion engine 1 in accordance with the operation condition of the internal combustion engine 1 and requests made by a driver.

The ECU 10 is electrically connected, with a crank position sensor 91. The ECU 10 receives from the crank position sensor 91 a signal representing the rotational angle of the output shaft of the internal combustion engine 1 and calculates the engine speed.

The ECU 10 is also connected with the first fuel injection valve 81, the second fuel injection valve 82, the third fuel injection valve 83, and the ignition plug 9 by electrical wiring. Thus, these devices are controlled by the ECU 10. In this embodiment either one of or both of the second fuel injection valve 82 and the third fuel injection valve 83 may inject gasoline.

The ignition plug 9 is arranged at a location closer to the second intake port 42 than the first intake port 41. In other words, if the cylinder 2 shown in FIG. 2 is imaginarily divided, by a plane containing the center axis of the cylinder 2 into a first half including the first intake port 41 and the first intake valve 61 and a second half including the second intake port 42 and the second intake valve 62, the ignition plug 9 is arranged in the half including the second intake port 42 and the second intake valve 62. Thus, the ignition plug 9 is arranged in such a way that the gas flowing into the cylinder from the second intake port 42 during the intake stroke impinges on the ignition plug 9 in a larger quantity than the gas flowing into the cylinder from the first intake port 41.

With the above-described configuration of the internal combustion engine 1, hydrogen flowing into the cylinder 2 from the first intake port 41 does not tend to impinge on the ignition plug 9. The temperature of the ignition plug 9 tends to be higher than the other components in the cylinder 2. Hydrogen has a higher ignitability than gasoline and can burn over a wide range of excess air factor. Therefore, if the hydrogen flowing into the cylinder 2 impinges on the hot ignition plug 9, there is a possibility that hot surface ignition occurs before the time of ignition. The hot surface ignition can lead to backfire or pre-ignition. In the case of the internal combustion engine 1 according to this embodiment, hot surface ignition can be prevented from occurring thanks to the above-described configuration in which hydrogen flowing into the cylinder 2 from the first intake port 41 does not tend to impinge on the hot ignition plug 9.

In the internal combustion engine 1 according to this embodiment, the second fuel injection valve 82 may be eliminated, and only the third fuel injection valve 83 may be provided to inject gasoline through it. In that case also, hydrogen does not tend to impinge on the ignition plug 9. In the case where the second fuel injection valve provided to inject gasoline through it, it is possible to lower the temperature of the gas flowing through the second intake port 42 by the latent heat of vaporization of gasoline. Since the ignition plug 9 is arranged in the imaginary half of the cylinder 2 including the second intake port 42 as described above, the low temperature gas flowing into the cylinder 2 through the second intake port 42 is apt to impinge on the ignition plug 9. The impingement of the lower temperature gas on the ignition plug 9 during the intake stroke can lower the temperature of the ignition plug 9. In consequence, even if hydrogen flows to impinge on the ignition plug 9 thereafter, hot surface ignition can be prevented from occurring.

As described above, according to this embodiment, since hydrogen enters the cylinder 2 at a location remote from the ignition plug 9, hydrogen is prevented from impinging on the hot ignition plug 9. Moreover, in the case where gasoline is injected into the second intake port 42, the ignition plug 9 is cooled by the latent heat of vaporization of gasoline. Thus, hot surface ignition can be prevented from occurring before the time of ignition, preventing the occurrence of pre-ignition or backfire.

Second Embodiment

In the second embodiment, the third fuel injection valve 83 has injection ports that are oriented in directions from the first intake port 41 side to the second intake port 42 side but no injection ports that are oriented in directions from the second intake port 42 side to the first intake port 41 side. Specifically, in cases where the third fuel injection valve 83 is provided at a location near the center axis of the cylinder 2, if the cylinder 2 is divided imaginarily by a plane containing the center axis of the cylinder 2 into a first half including the first in port 41 and the first intake valve 61 and a second half including the second intake port 42 and the second intake valve 62, the third fuel injection valve 83 has injection ports that open to the imaginary half of the cylinder 2 that includes the second intake port 42 and the second intake valve 62 but no injection ports that open to the imaginary half of the cylinder 2 that includes the first intake port 41 and the first intake valve 61. The ECU 10 is configured to cause the third fuel injection valve 83 to inject gasoline during the compression stroke after the intake bottom dead center. In this embodiment, the ECU 10 functions as the controller according to the present disclosure in causing the third fuel injection valve 83 to inject gasoline during the compression stroke after the intake bottom dead center.

Figure 3:
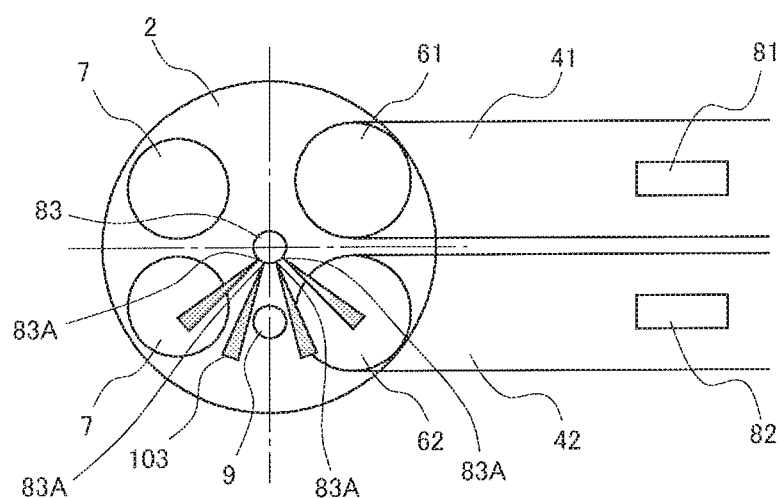
FIG. 3 is a schematic diagram showing a cylinder of the internal combustion engine according to the second embodiment seen from above.

FIG. 3 is a schematic diagram showing the cylinder 2 of the internal combustion engine 1 according to the second embodiment seen from above. In FIG. 3, the third fuel injection valve 83 is arranged substantially at the center of the cylinder 2, though the location of the third fuel injection valve 83 is not limited to the center. The third fuel injection valve 83 of this embodiment has injection ports 83A, which include injection ports that are oriented in directions from the first intake port 41 side to the second intake port 42 side but no injection ports that are oriented in directions from the second intake port 42 side to the first intake port 41 side. In other words, if the cylinder 2 shown in FIG. 3 is divided into the imaginary half including the first intake valve 61 and the imaginary half including the second intake valve 62, the injection ports 83A are arranged in such a way as to open to the imaginary half including the second intake valve 62 and not open to the imaginary half including the first intake valve 61.

Figure 4:
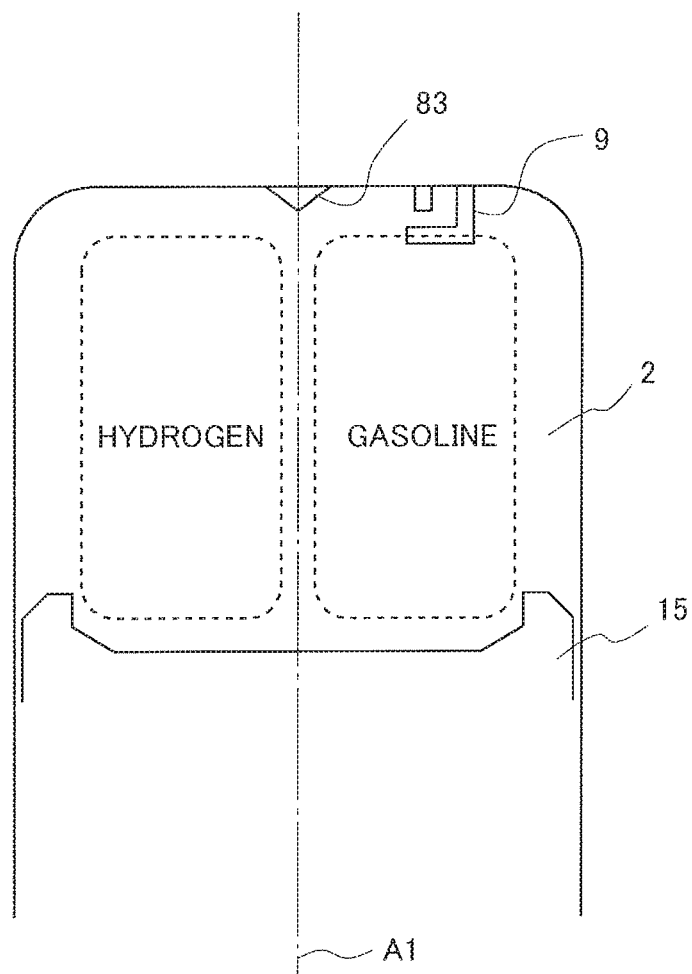
FIG. 4 shows the distribution of gas in the cylinder during the intake stroke.

FIG. 4 shows the distribution of gas in the cylinder 2 during the intake stroke. FIG. 4 is a cross sectional view of the cylinder taken on a plane containing the center axis A1 of the cylinder 2 and the center axis of the ignition plug 9. In FIG. 4, the first intake port 41 and the first intake valve 61 are located on the left side of the center axis A1, and the second intake port 42 and the second intake valve 62 are located on the right side of the center axis A1, which is also the case in FIGS. 5 to 7 referred to later. Therefore, during the intake stroke, gas containing hydrogen (which will also be referred to as hydrogen mixture gas hereinafter) flows into the left part of the cylinder 2 in FIG. 4 through the first intake port 41, and gas containing gasoline (which will also be referred to as gasoline mixture gas hereinafter) flows into the right part of the cylinder 2 in FIG. 4 through the second intake port 42. The internal combustion engine 1 according to this embodiment is designed in such a way that the intensity of swirl and tumble is low. Therefore, the hydrogen mixture gas and the gasoline mixture gas taken into the cylinder 2 with the downward motion of the piston scarcely mix with each other but exist as separate mixture gases in the cylinder 2. In consequence, the gasoline mixture gas having flown into the cylinder 2 through the second intake port 42 is present around the ignition plug 9, and the hydrogen mixture having flown into the cylinder 2 through the first intake port 41 is present in a region relatively distant from the ignition plug 9. If ignition by the ignition plug 9 is conducted in this state, there is a possibility that combustion will not occur, because the ignitability of gasoline is lower than hydrogen. In this case, moreover, supplied hydrogen is not made use of effectively. In this embodiment, to avoid such a situation, hydrogen is caused to move before the time of ignition.

Figure 5:
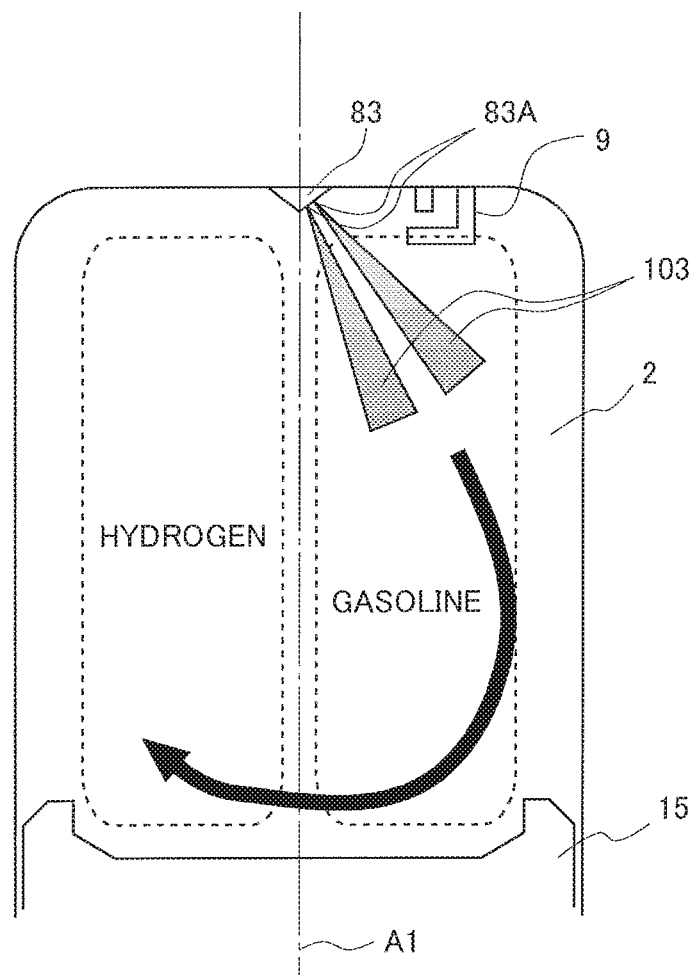
FIG. 5 shows the distribution of gases in the cylinder at a time after the intake bottom dead center.

FIG. 5 shows the distribution of the gases in the cylinder 2 at a time after the intake bottom dead center. In this embodiment, gasoline is injected by the third fuel injection valve 83 during the compression stroke after the intake bottom dead center to create a rotational flow in the cylinder 2. Since the injection ports 83A of the third fuel injection valve 83 are oriented to the second intake port 42 side, gasoline jets 103 ejected from the third fuel injection valve 83 flow from the injection ports 83A in directions toward the gasoline mixture gas. Such flows of gasoline lets 103 create a rotational flow about an axis perpendicular to the center axis A1 of the cylinder 2 as shown in FIG. 5. This rotational flow causes the hydrogen mixture gas and the gasoline mixture gas to flow. In the following, the side of the cylinder 2 on which the third fuel injection valve 83 is provided will be referred to as the upper side, and the side of the piston 15 will be referred to as the lower side.

Figure 6:
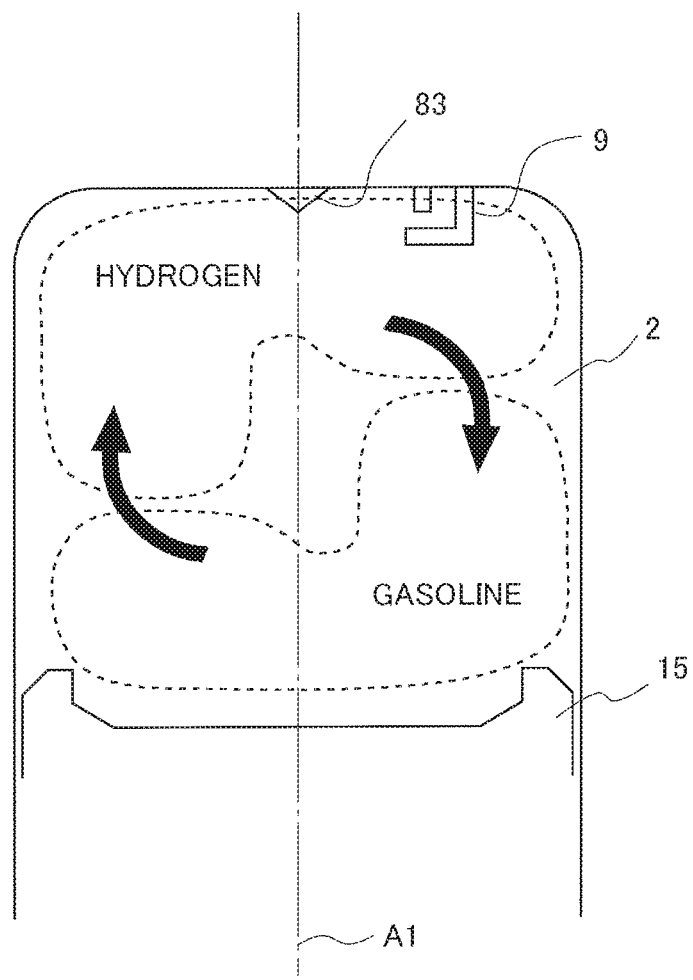
FIG. 6 shows the distribution of gases in the cylinder at a time during the compression stroke after the injection of fuel by the third fuel injection valve.

FIG. 6 shows the distribution of the gases in the cylinder 2 at a time during the compression stroke after the injection of gasoline by the third fuel injection valve 83. As indicated by arrows in FIG. 6, the hydrogen mixture gas has moved to the upper region in the cylinder 2, and the gasoline mixture gas has moved to the lower region in the cylinder 2. Thus, the hydrogen mixture gas is present around the ignition plug 9. During the intake stroke, the ignition plug 9 is cooled by the gas flowing into the cylinder 2 from the second intake port 42. In consequence, the temperature of the ignition plug 9 during the compression stroke is lower than the temperature of the ignition plug 9 in the early stage of the intake stroke. Hence, during the compression stroke, the presence of hydrogen mixture gas around the ignition plug 9 hardly leads to hot surface ignition.

Figure 7:
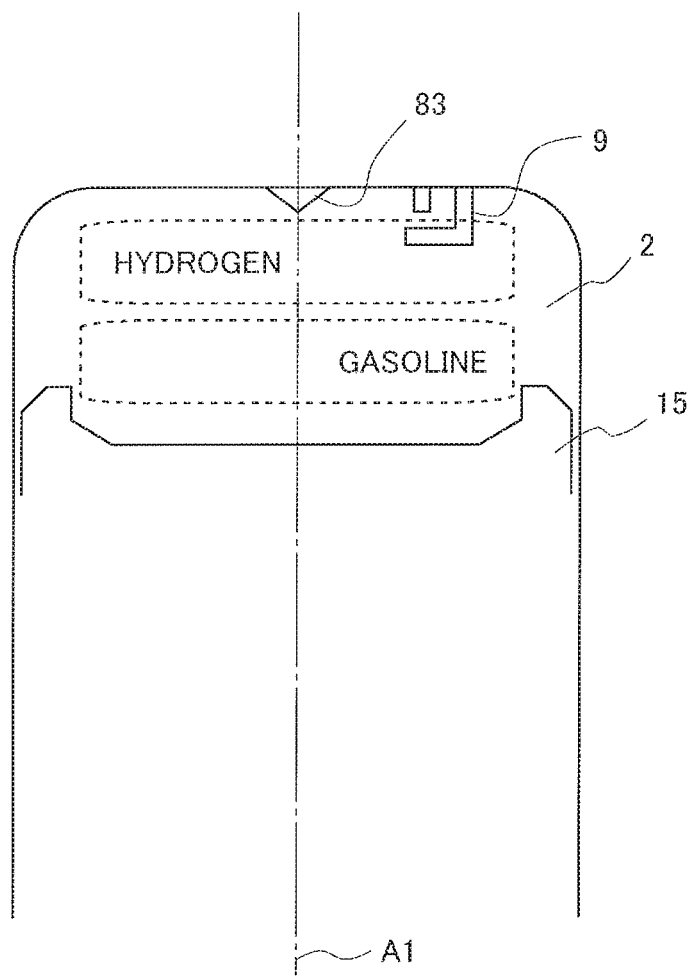
FIG. 7 shows the distribution of gas in the cylinder at the time of ignition.

FIG. 7 shows the distribution of the gases in the cylinder 2 at the time of ignition. As shown in FIG. 7 the hydrogen mixture gas is present in the upper region in the cylinder 2, and the gasoline mixture gas is present in the lower region in the cylinder 2. When the ignition by the ignition plug 9 is conducted in this state, hydrogen starts to burn firstly. Hydrogen has a higher ignitability than gasoline and can burn over a wide range of excess air factor. Therefore, as the ignition is conducted in the state in which the hydrogen mixture gas is present around the ignition plug 9, satisfactory combustion can be brought about even in the case, for example, where EGR gas is supplied or where hydrogen and gasoline are supplied so as to achieve an air-fuel ratio higher than the theoretical air-fuel ratio (namely, a lean air-fuel ratio).

Figure 8:
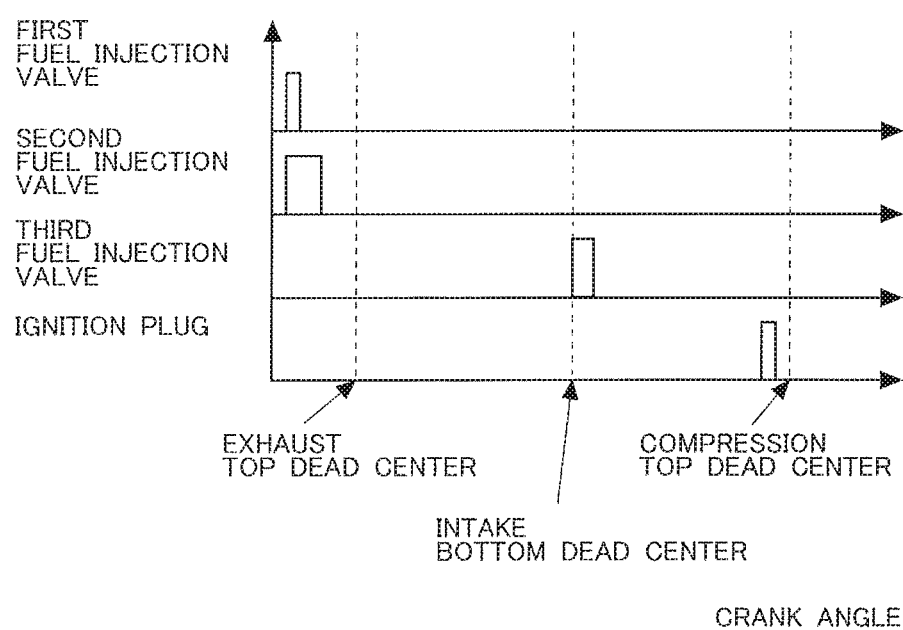
FIG. 8 is a graph showing the timing of fuel injection by the first fuel injection valve, the second fuel injection valve, and the third fuel injection valve and the timing of ignition by the ignition plug.

FIG. 8 is a graph showing the timing of fuel injection by the first fuel injection valve 81, the second fuel injection valve 82, and the third fuel injection valve 83 and the timing of ignition by the ignition plug 9. The horizontal axis of this graph represents the crank angle. Since fuel injection by the first fuel injection valve 81 and the second fuel injection valve 82 is performed during the intake stroke, fuel is injected by the first fuel injection valve 81 and the second fuel injection valve 82 before the exhaust top dead center. Fuel injection by the first fuel injection valve 81 and the second fuel injection valve 82 may be performed at a time during, the intake stroke at which fuel can be taken into the cylinder 2. The time of fuel injection by the third fuel injection valve 83 is set at a time during the compression stroke after the intake bottom dead center. More specifically, fuel injection by the third fuel injection valve 83 is performed at a time at which the hydrogen mixture gas can be brought to the region around the ignition plug 9, before the time of ignition during the compression stroke. The time of ignition is set at a time during the compression stroke before the compression top dead center.

Figure 9:
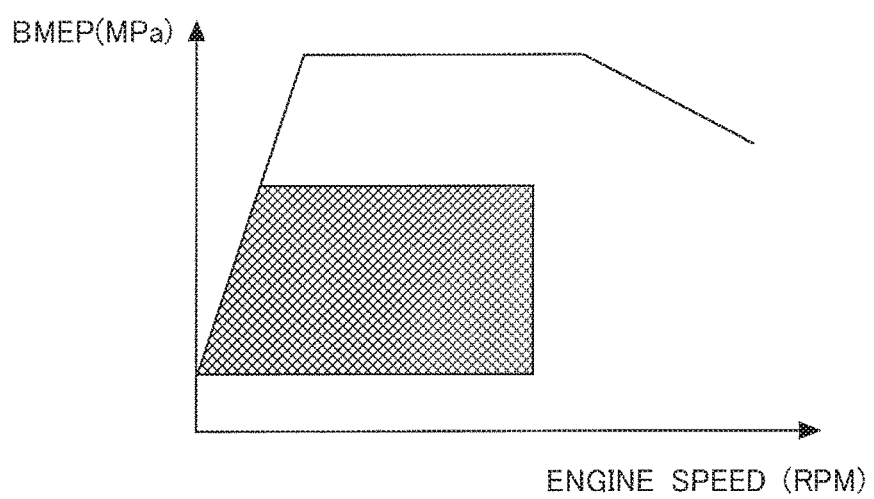
FIG. 9 is a graph showing the operation range in which fuel injection s performed by the first fuel injection valve, the second fuel injection valve, and the third fuel injection valve.

FIG. 9 is a graph showing the operation range in which fuel injection is performed by the first fuel injection valve 81, the second fuel injection valve 82, and the third fuel injection valve 83. In FIG. 9, the horizontal axis represents the engine speed (rpm), and the vertical axis represents the brake mean effective pressure BMEP (Mpa). Fuel injection is performed by all of the first fuel injection valve 81, the second fuel injection valve 82, and the third fuel injection valve 83 in the operation range represented by the hatched area in FIG. 9, namely the operation range of low to middle load. In the case where the internal combustion engine 1 is provided with an EGR system, this operation range is the operation range in which the supply of EGR gas is performed. In another case, this operation range is the operation range in which the internal combustion engine 1 is operated at lean air-furl ratios. In the case where EGR gas is supplied or in the case where the internal combustion engine 1 is operated at lean air-fuel ratios, hydrogen is supplied to improve the thermal efficiency. The optimum time of fuel injection and the optimum, fuel injection quantity of each of the first fuel injection valve 81, the second fuel injection valve 82, and the third fuel injection valve 83 in this operation range are determined in advance by experiment or simulation in connection with operation conditions such as the cooling water temperature in the internal combustion engine 1. For example, the quantity of fuel injected through the third fuel injection valve 83 is adjusted so that the hydrogen mixture gas can be brought to the region around the ignition plug 9. As shown in FIG. 7, the orientation and the number of the injection ports 83A of the third fuel injection valve 83 are determined in such a way that the hydrogen mixture gas will be brought to the region around the ignition plug 9 after the fuel injection through the third fuel injection valve 83. The orientation and the number of the injection ports 83A of the third fuel injection valve 83 may be optimized by experiment or simulation.

In the other operation ranges (namely, the operation ranges without hatching in FIG. 9), fuel injection performed only by the third fuel injection valve 83. In these operation ranges, hydrogen is not supplied, because the supply of hydrogen can lead to pre-ignition in these operation ranges. As fuel is injected only through the third fuel injection valve 83, the occurrence of knocking can be suppressed by the latent heat of vaporization of gasoline. The operation ranges without hatching in FIG. 9 are the operation ranges in which the supply of EGR gas is not performed or the operation ranges in which the internal combustion engine 1 is not operated at air-fuel ratios higher than the theoretical air-fuel ratio.

As described above, according to this embodiment, the injection ports 83A of the third fuel injection valve 83 are oriented in directions from the first intake port 41 side to the second intake port 42 side but not oriented in directions from the second intake port 42 side to the first intake port 41 side. This arrangement can create a rotational flow in the cylinder 2 by fuel injection through the third fuel injection valve 83. As fuel injection through the third fuel injection valve 83 is performed during the compression stroke after the intake bottom dead center, the hydrogen mixture gas is brought to the region around the ignition plug 9, so that satisfactory combustion can be achieved. Moreover, since the hydrogen mixture gas can burn efficiently, a reduction in the quantity of hydrogen to be supplied can be achieved. While the amount of hydrogen that a vehicle can bring has a limit, reduction in the quantity of hydrogen to be supplied can provide an increase in the travel distance by the same amount of hydrogen.

While in this embodiment the third fuel injection valve 83 is arranged on the center axis A1 of the cylinder 2, the location of the third fuel injection valve 83 is not limited to this. The third fuel injection valve 83 may be arranged at any position so long as it can bring the hydrogen mixture gas to the region around the ignition plug 9.

While in this embodiment gasoline is supplied through both the second fuel injection valve 82 and the third fuel inject on valve 83, gasoline may be supplied only through the third fuel injection valve 83 alternatively. In the case where gasoline is injected only through the third fuel injection valve 83, fuel injection through the third fuel injection valve 83 is performed once during the intake stroke and once during the compression stroke, namely twice in total. The timing and the fuel injection quantity of each fuel injection is determined by experiment or simulation.

Third Embodiment

In the third embodiment, the time to finish closing the intake valve 6 is set at a time advanced from the intake top dead center. Specifically, the time to finish closing the intake valve 6 is set at a time advanced from the intake top dead center only when the internal combustion engine is operated in the operation range represented by the hatched area in FIG. 9. The timing of opening and closing the intake valve 6 is varied by the variable intake-valve actuating mechanism 65, and the timing of opening and closing the exhaust valve 7 is varied by the variable exhaust-valve actuating mechanism 75. The variable intake-valve actuating mechanism 65 and the variable exhaust-valve actuating mechanism 75 are controlled by the ECU 10. In this embodiment, the ECU 10 functions as the controller according to the present disclosure in advancing the time to finish closing the intake valve 6 from the intake bottom dead center.

If the time to finish closing the intake valve 6 is retarded from (i.e. set later than) the intake bottom dead center, the gas in the cylinder 2 will flow back into the intake port 4 in the compression stroke. Having been heated in the cylinder, this backflow gas has a temperature higher than the gas in the intake port 4 that has never been taken into the cylinder. The high temperature gas that has flown back to the intake port 4 will be taken into the cylinder 2 in the next intake stroke. Thus, in the case where the time to finish closing the intake valve 6 is retarded from the intake bottom dead center, the temperature of the gas taken into the cylinder 2 will have a higher temperature, leading to deterioration of the effect of cooling the ignition plug 9 by the gas flowing into the cylinder 2 through the second intake port 42 during the intake stroke. Then, hot surface ignition will be apt to occur.

On the other hand, in the case where the time to finish closing the intake valve 6 is advanced from (i.e. set earlier than) the intake bottom dead, center as in this embodiment, the intake valve 6 is fully closed during the compression stroke, and the high temperature gas is prevented from flowing back from the cylinder 2 into the intake port 4. Thus, the temperature of the gas that is taken into the cylinder 2 from the intake port 4 during the next intake stroke is prevented from rising, and the ignition plug 9 is cooled satisfactorily by this gas. Therefore, hot surface ignition is prevented from occurring.

Figure 10:
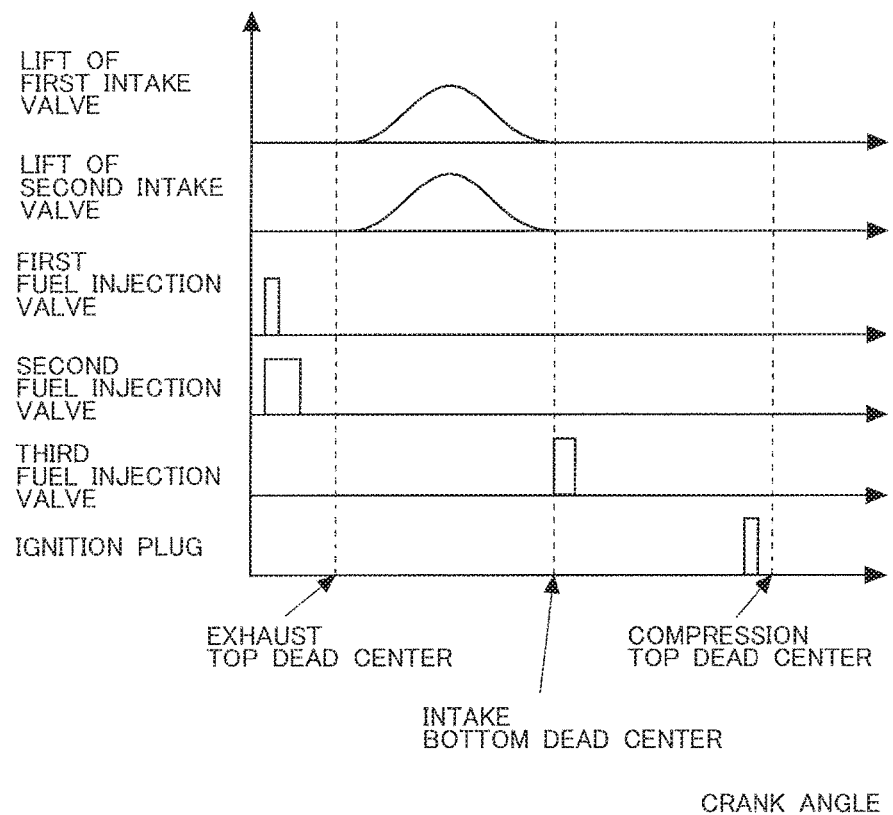
FIG. 10 shows the lift of the first intake valve and the second intake valve, the timing of fuel injection by the first fuel injection valve, the second fuel injection valve, and the third fuel injection valve, and the timing of ignition by the ignition plug.

FIG. 10 shows the lift of the first intake valve 61 and the second intake valve 62, the timing of fuel injection by the first fuel injection valve 81, the second fuel injection valve 82, and the third fuel injection valve 83, and the timing of ignition by the ignition plug 9. In FIG. 10, the horizontal axis represents the crank angle. The timing of fuel injection by the first fuel injection valve 81, the second fuel injection valve 82, and the third fuel injection valve 83, and the timing of ignition by the ignition plug 9 shown in FIG. 10 are the same as those in FIG. 8. The time to start opening the first intake valve 61 and the second intake valve 62 is set later than the exhaust top dead center. The lift of the first intake valve 61 and the lift of the second intake valve 62 are equal to each other at every crank angle. The time to finish closing the first intake valve 61 and the second intake valve 62 is set earlier than the intake bottom dead center.

As the time to finish closing the first intake valve 61 and the time to finish closing the second intake valve are set to the same time and the lift of the first intake valve 61 and the lift of the second intake valve 62 are set equal to each other at every crank angle, the quantity of gas flowing into the cylinder 2 per unit time through the first intake port 41 and the quantity of gas flowing into the cylinder 2 per unit time through the second intake port 42 are substantially equal to each other. If the quantity of gas flowing into the cylinder 2 per unit time through the first intake port 41 and that through the second intake port 42 are different from each other, gas will flow from the intake port 4 that supplies a larger quantity of gas to the intake port 4 that supplies a smaller quantity of gas to create a rotational flow in the cylinder 2. Then, mixing of the hydrogen mixture gas and the gasoline mixture gas will be promoted, and the hydrogen concentration in the gas brought to the region around the ignition plug will be lowered, resulting in deteriorated ignitability. In the case of this embodiment, since the quantity of gas flowing into the cylinder 2 per unit time through the first intake port 41 and that through the second intake port 42 are substantially equal to each other, the hydrogen mixture gas and the gasoline mixture gas does not tend to be mixed. Therefore, deterioration of ignitability can be prevented. Moreover, since the time to finish closing the first intake valve 61 and the second intake valve 62 is set earlier than the intake bottom dead center, high temperature gas can be prevented from flowing back from the cylinder 2 to the intake port 4. In consequence, the temperature of the gas taken into the cylinder 2 during the next intake stroke is prevented from rising. This enables satisfactory cooling of the ignition plug 9 by the gas flowing into the cylinder from the second intake port 42, thereby achieving reliable prevention of hot surface ignition. Thus, combustion is prevented from occurring by hot surface ignition before the time of ignition. The time to start opening the first intake valve and the second intake valve 62, the time to finish closing the first intake valve 61 and the second intake valve 62, and the lift of the first intake valve 61 and the second intake valve 62 are determined in advance experiment or simulation.

The invention claimed is:

1. An internal combustion engine using hydrocarbon and hydrogen as fuel, comprising:
    a first intake port and a second intake port connected to a cylinder;
    a first fuel injection valve provided in said first intake port to inject hydrogen into said first intake port; and
    an ignition plug provided at a position at which the gas flowing into the cylinder from said second intake port impinges on said ignition plug in a larger quantity than the gas flowing into the cylinder from said first intake port during the intake stroke.

2. The internal combustion engine according to claim 1, further comprising a second fuel injection valve that is provided in said second intake port to inject hydrocarbon into said second intake port, wherein said ignition plug is disposed at a position at which the temperature of said ignition plug is made lower when hydrocarbon is injected by said second fuel injection valve than when hydrocarbon is not injected by said second fuel injection valve.

3. The internal combustion engine according to claim 1, further comprising a third fuel injection valve that is provided in said cylinder to inject hydrocarbon into said cylinder, wherein said ignition plug is disposed at a position closer to the connection of said second intake port and said cylinder than the connection of said first intake port and said cylinder, and said third fuel injection valve has an injection port oriented in a direction from said first intake port side to said second intake port side but no injection port oriented in a direction from said second intake port side to said first intake port side.

4. The internal combustion engine according to claim 3, further comprising a controller configured to cause said third fuel injection valve to inject hydrocarbon during the compression stroke after the intake bottom dead center.

5. The internal combustion engine according to claim 1, further comprising a second intake valve that opens and closes said second intake port, and a controller configured to advance the time to finish closing said second intake valve from said intake bottom dead center.

* * * * *

UNITED STATES PATENT AND TRADEMARK OFFICE
CERTIFICATE OF CORRECTION

PATENT NO. : 10,415,512 B2
APPLICATION NO. : 15/958458
DATED : September 17, 2019
INVENTOR(S) : Koshiro Kimura Page 1 of 1

It is certified that error appears in the above-identified patent and that said Letters Patent is hereby corrected as shown below:

In the Specification

In Column 3, Line 22, before "temperature", insert --high--.
In Column 3, Line 65, after "injection", delete "s" and insert --is--, therefor.
In Column 4, Line 28, after "engine", insert --1--.
In Column 5, Line 21, after "connected", delete ",".
In Column 5, Line 36, after "divided", delete ",".
In Column 6, Line 1, after "valve", insert --82 is--.
In Column 6, Line 35, delete "in port" and insert --intake port--, therefor.
In Column 7, Line 20, after "piston", insert --15--.
In Column 8, Line 50, delete "air-furl" and insert --air-fuel--, therefor.
In Column 8, Line 54, after "optimum", delete ",".
In Column 9, Line 5, after "injection", insert --is--.
In Column 9, Line 43, delete "inject on" and insert --injection--, therefor.
In Column 10, Line 21, after "dead", delete ",".
In Column 10, Line 47, after "valve", insert --62--.
In Column 10, Line 62, after "plug", insert --9--.
In Column 11, Line 14, after "valve", insert --61--.

Signed and Sealed this
Third Day of December, 2019

Andrei Iancu
*Director of the United States Patent and Trademark Office*